(12) United States Patent
Hegde et al.

(10) Patent No.: US 9,703,813 B2
(45) Date of Patent: Jul. 11, 2017

(54) DATA AGING IN HANA USING GRADING ATTRIBUTES

(71) Applicant: SAP SE, Walldorf (DE)

(72) Inventors: Sumanth Hegde, Bangalore (IN); Dharshan A, Davangere (IN)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 14/501,626

(22) Filed: Sep. 30, 2014

(65) Prior Publication Data

US 2016/0092555 A1    Mar. 31, 2016

(51) Int. Cl.
G06F 7/00 (2006.01)
G06F 17/00 (2006.01)
G06F 17/30 (2006.01)

(52) U.S. Cl.
CPC .............................. *G06F 17/30306* (2013.01)

(58) Field of Classification Search
None
See application file for complete search history.

(56) References Cited

U.S. PATENT DOCUMENTS

| | | | |
|---|---|---|---|
| 7,702,649 B1* | 4/2010 | Bresch | G06F 17/30917 707/999.104 |
| 2002/0161736 A1* | 10/2002 | Beygelzimer | G06F 17/30716 |
| 2005/0165815 A1* | 7/2005 | Ozzie | G06F 17/2205 |
| 2006/0179065 A1* | 8/2006 | Xu | G06F 17/30286 |
| 2010/0106672 A1* | 4/2010 | Robson | G06F 17/30997 706/50 |
| 2016/0012099 A1* | 1/2016 | Tuatini | G06F 17/30371 707/689 |

* cited by examiner

*Primary Examiner* — Susan Chen
(74) *Attorney, Agent, or Firm* — Jones Day

(57) ABSTRACT

According to an embodiment of the present disclosures, systems, methods, and non-transitory computer-readable mediums having program instructions thereon, provide for process of segregating data from database tables into different layers depending on the frequency of access to the data—so that each layer of the data can be stored in an appropriate storage mechanism. For example, infrequently-accessed data can be stored in a hard disk drive (HDD) and frequently-accessed can be stored in random-access memory (RAM). Further, the data can also be stored in a sold-state drive (SSD) or other memory-storing devices. In an embodiment, grading attributes are used to layer the data and, accordingly, segregate the data into appropriate storage mechanisms.

18 Claims, 7 Drawing Sheets

FIG. 3

Financial Posting Table
301

| Table | Description |
|---|---|
| FIN_POST_HEAD | Financial posting header |
| FIN_POST_ITEM | Financial posting item |

Table FIN_POST_HEAD
302

| Posting Header | Amount | Posting_date | Posting Quarter | .... |
|---|---|---|---|---|
| 1123 | 2000 | 14.06.2011 | Q2/2011 | |
| 11245 | 1200 | 12.07.2013 | Q3/2013 | |
| 11223 | 400 | 13.08.2013 | Q3/2013 | |

Table FIN_POST_ITEM
303

| Posting Item | Posting Header | .... |
|---|---|---|
| 21123 | 1123 | |
| 211245 | 11245 | |
| 211223 | 11223 | |

Grading Attribute Table 'FISCAL_VARIANT'
304

| Date | END_FISCAL_YEAR |
|---|---|
| 30.08.2012 | 31.12.2012 |
| 12.04.2013 | 31.12.2013 |
| 12.07.2013 | 31.12.2013 |
| 13.08.2013 | 31.12.2013 |

FIG. 3A

Join Definitions – V_HEAD_FY
305

| Table | Field | Table | Field |
|---|---|---|---|
| FIN_POST_HEAD | Posting_date | FISCAL_VARIANT | Date |

View Definitions – V_HEAD_FY
306

| Table | Field |
|---|---|
| FIN_POST_HEAD | PostingHeader |
| FISCAL_VARIANT | END_FISCAL_YEAR |

Data Aging Object Definition Table
307

| Data Aging Object | Table | GRADING_ATTRIBUTE | DETERMINE_VIEW |
|---|---|---|---|
| FIN_POST | FIN_POST_HEAD | END_FISCAL_YEAR | V_HEAD_FY |
| FIN_POST | FIN_POST_ITEM | END_FISCAL_YEAR | V_ITEM_FY |

LAYER_STORAGE_MAPPING Table
308

| Time Period | Layer Name | Storage |
|---|---|---|
| 01.01.2014 - 31.12.2014 | 2014 | RAM |
| 01.01.2013 - 31.12.2013 | 2013 | HDD |

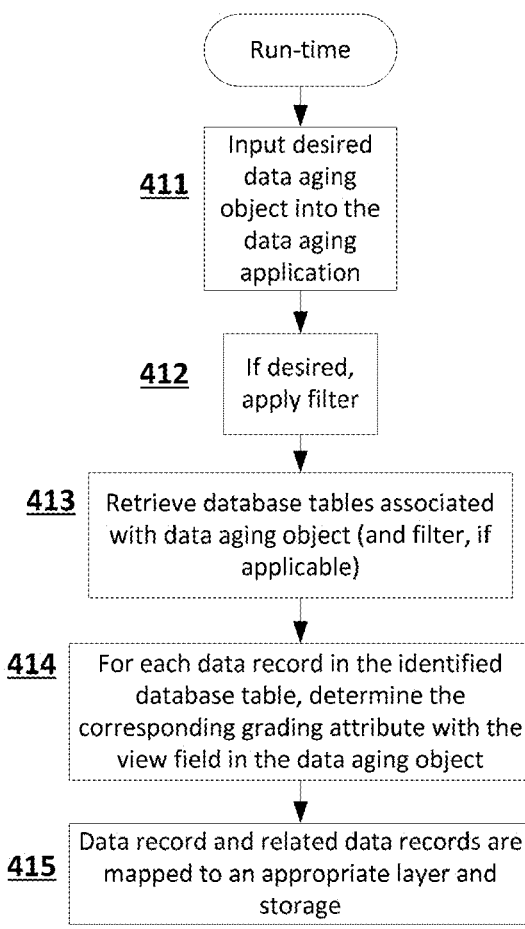

DATA AGING IN HANA USING GRADING ATTRIBUTES

FIELD

The present disclosure relates generally to a process of segregating data from database tables into different layers depending on the frequency of access to the data.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

FIG. 3 illustrates an embodiment of tables utilized during the customization of the data aging object definition table and the process of segregating data from database tables into different layers.

FIG. 4B illustrates an embodiment of utilizing the process of segregating data from database tables into different layers.

DETAILED DESCRIPTION

Figure 1:
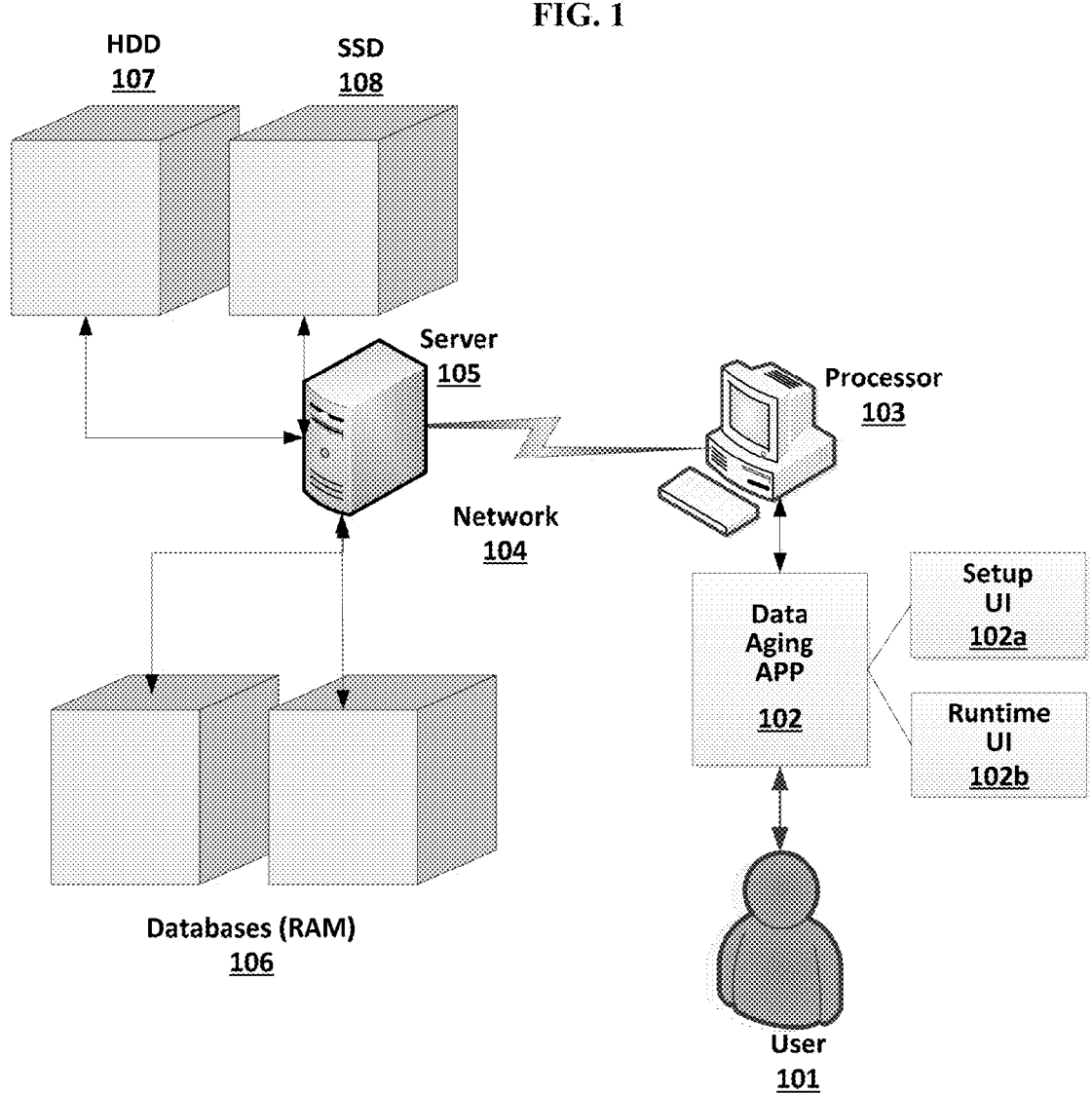
FIG. 1 illustrates an embodiment of a system utilizing the process of segregating data from database tables into different layers.

According to an embodiment of the present disclosures, systems, methods, and non-transitory computer-readable mediums having program instructions thereon, provide for a process of segregating data from database tables into different layers depending on the frequency of access to the data—so that each layer of the data can be stored in an appropriate storage mechanism. For example, infrequently-accessed data can be stored in a hard disk drive (HDD) and frequently-accessed can be stored in random-access memory (RAM). In another embodiment, the data can also be stored in a sold-state drive (SSD) or other memory-storing devices.

In an embodiment, the data stored in SSD can be of a type that is even less frequently accessed than the data stored in the HDD. Accordingly, data can be stored in (1) the RAM, (2) the HDD or (3) the SSD depending on the frequency of access to the data. In another embodiment, the infrequently-accessed data can be stored in either the HDD or the SSD. In other words, the data can be stored in either (1) the RAM or (2) either the HDD or the SSD. In an embodiment, storing the data in the HDD versus the SSD depends on a priority given to each storage device. In an embodiment, the priority given to the storage device depends on the cost of storing the data in the storage device at that particular moment. In other words, if the price of storing data on the HDD remains below SSD, then the HDD would be given a higher priority than the SSD. Thus, the infrequently-accessed data will be stored in the HDD instead of the SSD. However, in the event the price of storing data in the SSD falls below HDD, the SSD would be given a higher priority and, thus, the infrequently-accessed data will be stored in the SSD instead of the HDD.

In an embodiment, grading attributes are used to layer the data and, accordingly, segregate the data into appropriate storage mechanisms. In an embodiment, the grading attribute is a "date" data type. Further, in an embodiment, the grading attribute can be deduced from data in any table contained in a data aging object. In an embodiment, the data aging object is a data object representing the logical grouping of database tables (e.g., logic grouping of database tables which would make sense in a business environment). In an embodiment, if a certain data record of a database table corresponding to a data aging object is layered and stored in an appropriate storage device, then related data records in other database tables corresponding to the data aging object will be layered and stored in the exact same way. Accordingly, not all of the database tables corresponding to the data aging object have to be separately processed in order to determine the appropriate layer and storage device for each of the data records of the database tables. For example, in an embodiment, a data aging object can be used to represent the various database tables representing the financial postings of a company (e.g., Financial Posting Header, Financial Posting Item, etc.). Therefore, if a certain data record (e.g., data record 11245) in the Financial Posting Header database table is appropriately layered and stored, then the related data record in Financial Posting Item (e.g., data record 211245 of Financial Posting Item corresponds to data record 11245 of Financial Posting Header) will be layered and stored exactly the same way.

FIG. 1 illustrates an embodiment of a system utilizing the process of segregating data from database tables into different layers. In an embodiment, the system 100 consists of a user 101, a data aging application ("APP") 102, a processor 103, a network 104, a server 105, databases 106 ("RAM"), HDD 107 and SSD 108. In another embodiment, databases 106 is an in-memory database. Further, in an embodiment, APP 102 includes a separate user interface for the setup phase, e.g., setup user interface ("setup UI") 102a, and a separate user interface for the runtime phase, e.g., runtime user interface ("runtime UI") 102b. In another embodiment, the setup and runtime phases are performed with a single user interface. In an embodiment, the data aging object is configured during the setup phase. Further, in an embodiment, the data records of the database tables are appropriately layered and stored during the runtime phase.

Figure 2A:
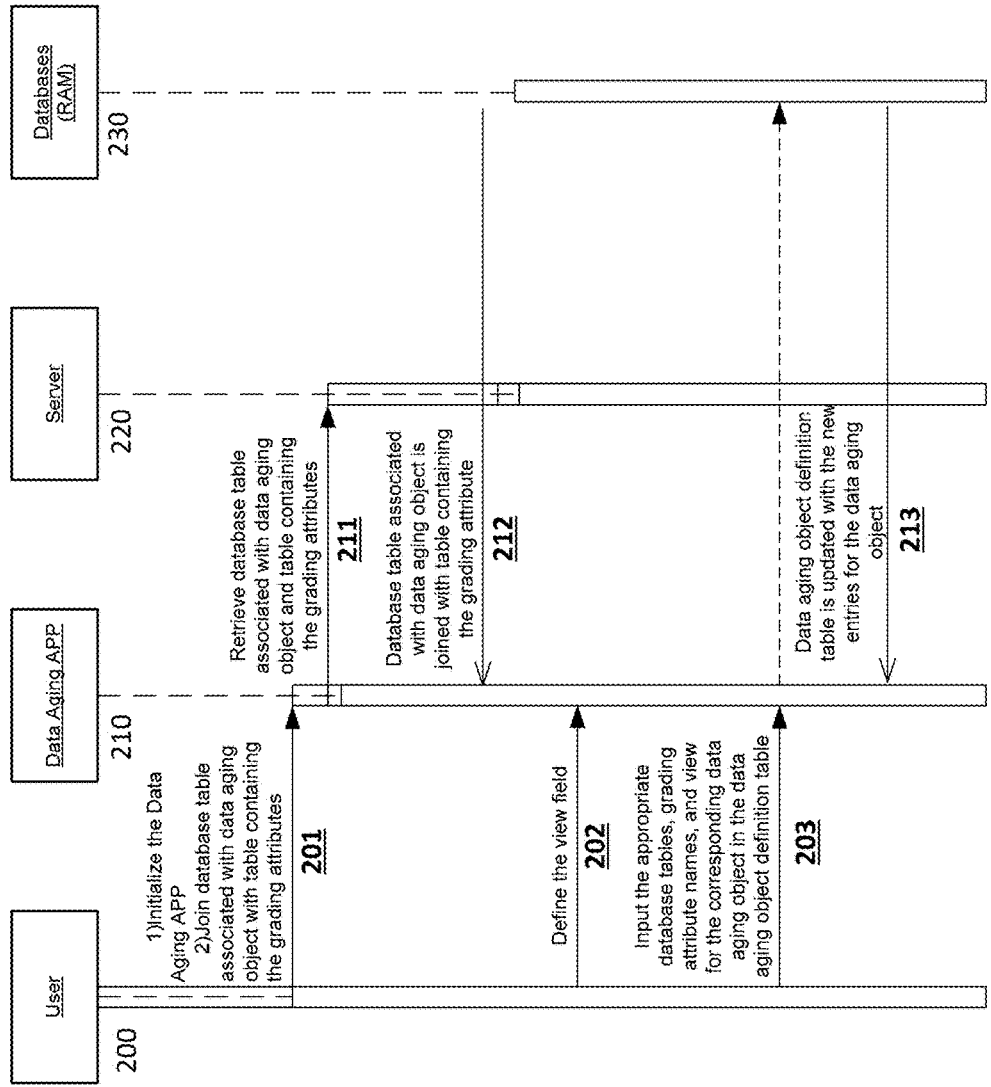
FIG. 2A illustrates an embodiment of the interaction between the elements of the system in order to customize the data aging object definition table (if a database table does not initially include a grading attribute).

FIG. 2A illustrates an embodiment of the interaction between the elements of the system in order to customize the data aging object definition table (if a database table does not initially include a grading attribute). In other words, FIG. 2A depicts an embodiment of the interaction between the elements of the system during the setup phase. In an embodiment, in step 201, user 200 initializes the Data Aging App 210 and subsequently joins the database table associated with data aging object (e.g., FIG. 3, table 302) with the table containing the grading attributes (e.g., FIG. 3, table 304). In step 211, the Data Aging APP 210 retrieves the database table associated with data aging object and the table containing the grading attributes. Accordingly, in step 212, the database table associated with data aging object and the table containing the grading attributes are joined. Then, in step 202, user 200 defines the "view" (i.e., an analytical data model corresponding to database tables used in relational database management systems). After the "view" is defined, in step 203, the user 200 inputs the appropriate database tables, grading attribute names and the "view" (which are all associated with a certain data aging object) into the data aging object definition table. Accordingly, in step 213, the data aging object definition table is updated with the new entries for the data aging object.

Figure 2B:
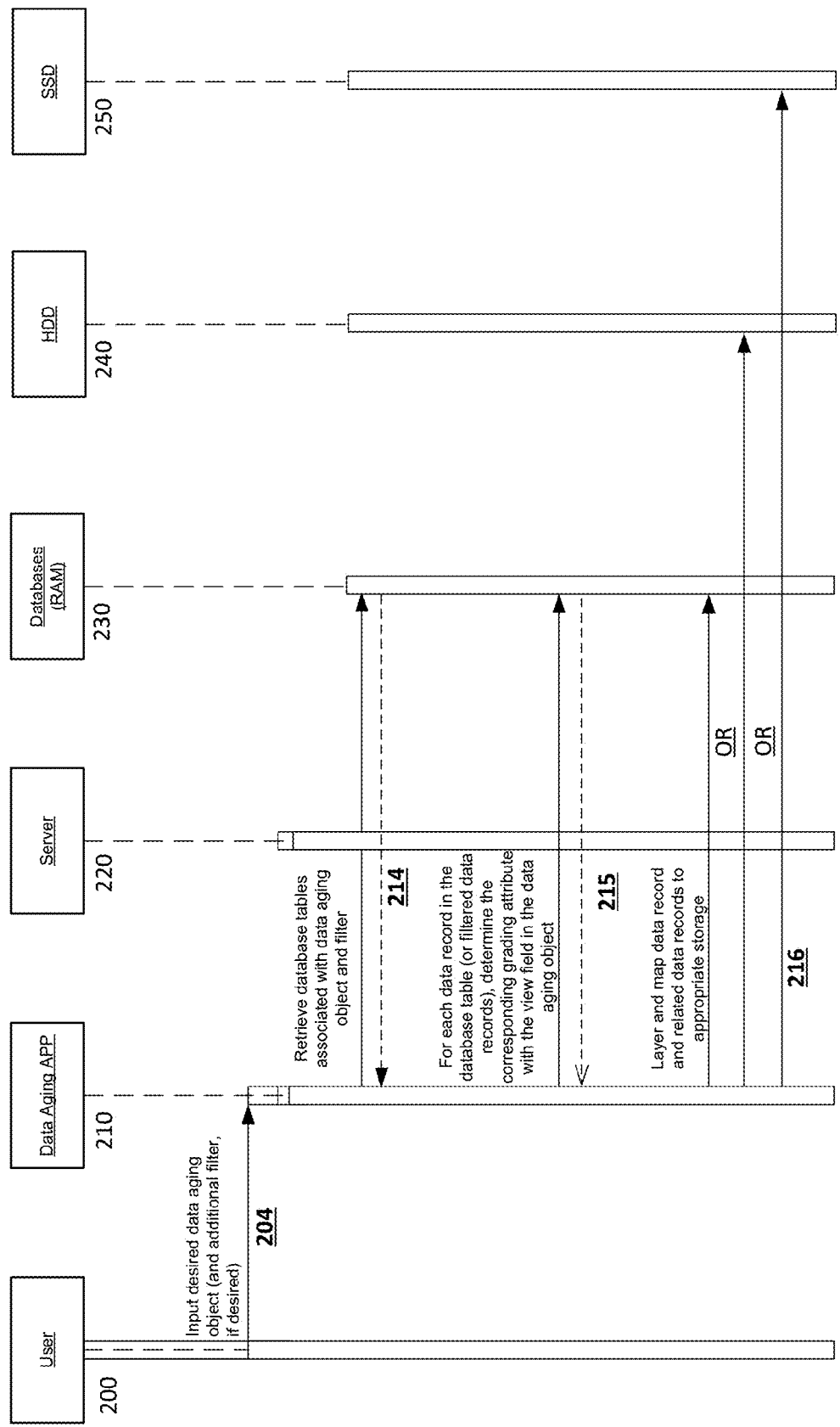
FIG. 2B illustrates an embodiment of the interaction between the elements of the system utilizing the process of segregating data from database tables into different layers.

FIG. 2B illustrates an embodiment of the interaction between the elements of the system utilizing the process of segregating data from database tables into different layers. In other words, FIG. 2B depicts an embodiment of the interaction between the elements of the system during the runtime phase. In an embodiment, in step 204, the user 200 inputs the desired data aging object (which corresponds to the database tables to be layered and segregated) into the Data Aging APP 210. In an embodiment, the user 200 can also add a filter corresponding to a certain attribute of the database tables. In other words, only the data records (of the database tables associated with the data aging object) which pass through the filter are layered and segregated to different storage mechanisms. In step 214, the Data Aging APP 210 retrieves the database tables associated with the data aging object. Then, in step 215, for each data record in the database table associated with the data aging object (or the filtered data records), the Data Aging APP 210 determines the corresponding grading attribute with the view field in the data aging object. In step 216, the Data Aging APP 210 layers and maps the aforementioned data record as well as other related data records (i.e., corresponding to the other database tables of the data aging object) to an appropriate storage mechanism according to the determined grading attribute (e.g., RAM or HDD or SSD).

FIG. 3 illustrates an embodiment of tables utilized during the customization of the data aging object definition table and the process of segregating data from database tables into different layers. In an embodiment, the tables of FIG. 3 are stored in a database. Financial Posting Table 301 is a table including two related tables: (1) FIN_POST_HEAD and (2) FIN_POST_ITEM. As depicted in Table 301, FIN_POST_HEAD refers to the "Financial posting header" and FIN_POST_ITEM refers to the "Financial posting item."

Table FIN_POST_HEAD 302 includes the contents of the table FIN_POST_HEAD described above. Table FIN_POST_HEAD 302 includes data regarding the "Posting Header," "Amount," "Posting Date" and "Posting Quarter." Likewise, Table FIN_POST_ITEM 303 includes the contents of the table FIN_POST_ITEM described above. Table FIN_POST_ITEM 303 includes data regarding the "Posting Item" and the "Posting Header."

Grading Attribute Table 'FISCAL_VARIANT' 304 includes data regarding arbitrary dates, "Date", and their corresponding grading attribute, "END_FISCAL_YEAR."

Join Definitions—V_HEAD_FY 305 refers to the "join" definitions for Table FIN_POST_HEAD 302 and Grading Attribute Table 'FISCAL_VARIANT' 304. Accordingly, tables 302 and 304 are joined corresponding to the "Posting_date" field of Table FIN_POST_HEAD 302 and to the "Date" field of Grading Attribute Table 'FISCAL_VARIANT' 304. In an embodiment, a similar "join" definition can be defined for Table FIN_POST_ITEM 303 and Grading Attribute Table 'FISCAL_VARIANT' 304.

View Definitions—V_HEAD_FY 306 refers to the "view" definitions for joined tables FIN_POST_HEAD 302 and Grading Attribute Table 'FISCAL_VARIANT' 304. Accordingly, when V_HEAD_FY is executed by the data aging application, only the "Posting Header" field (i.e., the primary key) of Table FIN_POST_HEAD 302 and the "END_FISCAL_YEAR" field of Grading Attribute Table 'FISCAL_VARIANT' 304 are parsed in order to determine the grading attribute for each data record. Therefore, the data aging application parses through less data, resulting in a more efficient process. In an embodiment, a similar "view" definition can be defined for joined tables Table FIN_POST_ITEM 303 and Grading Attribute Table 'FISCAL_VARIANT' 304.

Data Aging Object Definition Table 307 includes the definitions for each data aging object.

Each data aging object has a corresponding database table, grading attribute name and "view." As depicted, data aging object "FIN_POST" corresponds to tables FIN_POST_HEAD and FIN_POST_ITEM, wherein both tables correspond to the same grading attribute name but different "views," V_HEAD_FY and V_ITEM_FY, respectively.

Lastly, LAYER_STORAGE_MAPPING Table 308 refers to the mapping table utilized to determine the appropriate layer and storage mechanism. Accordingly, if the grading attribute, "END_FISCAL_YEAR" for a certain data object falls in the time period of "01.01.2014-31.12.2014," then the layer for that data object would be "2014" and its storage would be RAM. Likewise, if the grading attribute falls in the time period of "01.01.2013-31.12.2013," then the layer for that data object would be "2013" and its storage would be HDD.

Figure 4A:
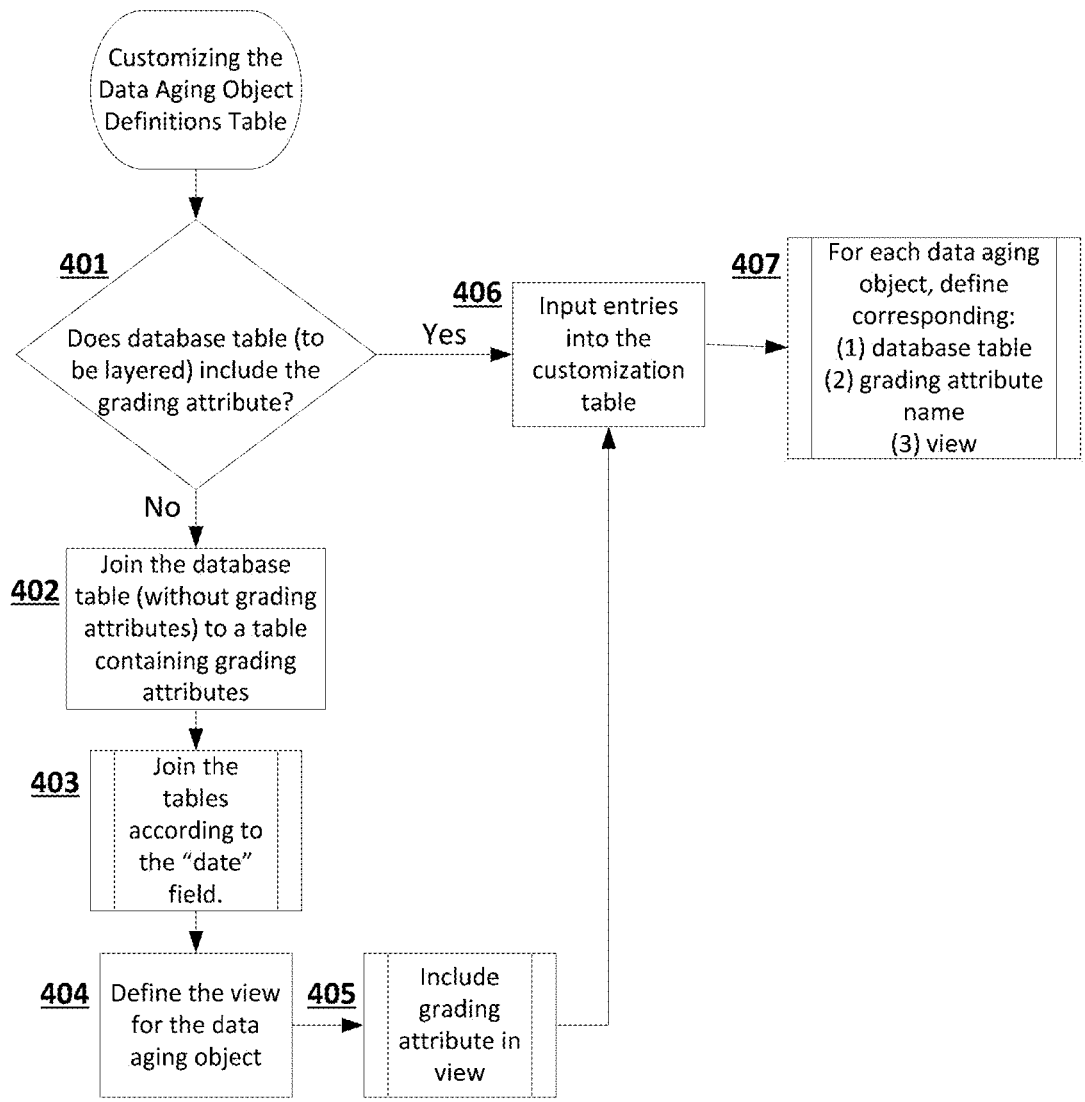
FIG. 4A illustrates an embodiment of a method for customizing the data aging object table (if a database table does not initially include a grading attribute).

FIG. 4A illustrates an embodiment of a method for customizing the data aging object table (if a database table does not initially include a grading attribute). In other words, FIG. 4A depicts an embodiment of the method during the setup phase. The process will be described using the tables of FIG. 3. In step 401, it is first determined if the database table to be layered includes grading attributes corresponding to each data record of the database table. If the database table does include grading attributes corresponding to each data record, then the method proceeds to step 406, which will be described later. Otherwise, the method proceeds to step 402.

In step 402, the user joins the database table without the grading attribute to a table with grading attributes. In an embodiment, the two tables are joined using a "join" definition. Accordingly, in step 403, the tables are joined corresponding to their respective "date" fields. For example, tables 302 (which does not include grading attributes) and 304 (which does include grading attributes, i.e., "END_FISCAL_YEAR") are joined corresponding to the "Posting_date" field of Table FIN_POST_HEAD 302 and to the "Date" field of Grading Attribute Table 'FISCAL_VARIANT' 304.

After the tables are joined, in step 404, the user has to define the "view" for the corresponding data aging object. Specifically, in step 405, the grading attribute associated with joined tables is included in the "view" definition. For example, a "view" definition can be defined as depicted in table 306. Accordingly, when V_HEAD_FY is executed by the data aging application, only the "Posting Header" field (i.e., the primary key) of Table FIN_POST_HEAD 302 and the "END_FISCAL_YEAR" field of Grading Attribute Table 'FISCAL_VARIANT' 304 are parsed in order to determine the grading attribute for each data record. After the "view" is defined, in step 406, the user inputs the appropriate database tables, grading attribute names and the "view" (which are all associated with a certain data aging object) into the data aging object definition table. For example, as depicted in table 307, data aging object "FIN_POST" corresponds to tables FIN_POST_HEAD and FIN_POST_ITEM, wherein both tables correspond to the same grading attribute name but different "views," V_HEAD_FY and V_ITEM_FY, respectively.

FIG. 4B illustrates an embodiment of utilizing the process of segregating data from database tables into different layers. In step 411, the user inputs a desired data aging object into the data aging application. For example, the user can select data aging object FIN_POST (as depicted in table 307). In addition, in step 412, the user can also apply a filter to the data aging object. For example, the filter can look for only those data records that fulfill the condition, "Posting Quarter=Q3/2013." In step 413, the database tables associated with the data aging object (and filter, if applicable) are retrieved. For example, in the determination run, first table FIN_POST_HEAD is picked up. Further, because a filter was applied, data records 11245 and 11223 of table FIN_POST_HEAD are selected by the data aging application. In step 414, for each data record in the identified database table, the corresponding grading attribute is determined with the view field in the data aging object. For example, data record 11245 has a "Posting Date" of "12.07.2013." Using the "view" V_HEAD_FY, the data aging application determines that the aforementioned "Posting Date" will correspond to an END_ FISCAL_YEAR (i.e., the grading attribute) of 31.12.2013. Lastly, in 415, the aforementioned data record as well as other related data records (i.e., corresponding to the other database tables of the data aging object) are mapped to an appropriate layer and storage mechanism according to the grading attribute. For example, using LAYER_STORAGE_MAPPING Table 308 with the grading attribute of 31.12.2013, the data aging application determines that data record 11245 belongs to layer "2013" and, therefore, storage "HDD." Likewise, because data record 11245 of FIN_POST_HEAD was layered with "2013" and mapped to "HDD," the corresponding related data record in FIN_POST_ITEM, data record 211245, will also be layered with "2013" and mapped to "HDD." Similarly, data record 11223, of FIN_POST_HEAD, and corresponding related data record 211223 (which has a "Posting Date" of "13.08.2013" corresponding to a grading attribute of 31.12.2013), of FIN_POST_ITEM, will also be layered with "2013" and mapped to "HDD." Accordingly, only one data record, of the related data records corresponding to a data aging object, needs to be processed in order to layer and map the related data records.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Although the foregoing invention has been described in some detail for purposes of clarity of understanding, it will be apparent that certain changes and modifications can be practiced within the scope of the appended claims. The described embodiment features can be used with and without each other to provide additional embodiments of the present invention. The present invention can be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A computer-implemented method for segregating at least one data record from a database table into at least two data layers, the method comprising:

retrieving, with a processor, the database table from a database in response to a user-inputted data aging object;

determining, with the processor, for each of the data records in the database table, the corresponding grading attribute; and mapping, with the processor, each of the data records and at least one other data record to one of the at least two data layers based on the corresponding grading attribute of each of the data records, wherein the at least one other data record corresponds to an at least one other database table, wherein the database table and the at least one other database table correspond to the data aging object;

wherein the data aging object is a data object representing a logical grouping of the database table and the at least one other database table such that the logically grouped database tables are similarly layered and stored in a storage device;

wherein the database is an in-memory database in which frequently accessed data is stored in random-access memory and less frequently accessed data is stored on a hard disk drive.

2. The method of claim 1, wherein the data aging object includes (1) the database table, (2) a grading attribute name and (3) a view.

3. The method of claim 2, wherein the corresponding grading attribute of the data record is determined through the view of a primary key of the database table and a grading attributes field of a table containing the grading attributes.

4. The method of claim 3, wherein the database table and the table containing the grading attributes are joined according to a first date field of the database table and a second date field of the table containing the grading attributes.

5. The method of claim 1, wherein the grading attribute is of a date data type.

6. The method of claim 1, wherein the mapping of the data record is done by a mapping table stored in the database.

7. A non-transitory computer readable medium containing program instructions for segregating at least one data record from a database table into at least two data layers, wherein execution of the program instructions by one or more processors of a computer system causes one or more processors to carry out the steps of:

retrieving the database table from a database in response to a user-inputted data aging object;

determining, for each of the data records in the database table, the corresponding grading attribute; and mapping each of the data records and at least one other data record to one of the at least two data layers based on the corresponding grading attribute of each of the data records, wherein the at least one other data record corresponds to an at least one other database table, wherein the database table and the at least one other database table correspond to the data aging object;

wherein the data aging object is a data object representing a logical grouping of the database table and the at least one other database table such that the logically grouped database tables are similarly layered and stored in a storage device;

wherein the database is an in-memory database in which frequently accessed data is stored in random-access memory and less frequently accessed data is stored on a hard disk drive.

8. The non-transitory computer readable medium of claim 7, wherein the data aging object includes (1) the database table, (2) a grading attribute name and (3) a view.

9. The non-transitory computer readable medium of claim 8, wherein the corresponding grading attribute of the data record is determined through the view of a primary key of the database table and a grading attributes field of a table containing the grading attributes.

10. The non-transitory computer readable medium of claim 9, wherein the database table and the table containing the grading attributes are joined according to a first date field of the database table and a second date field of the table containing the grading attributes.

11. The non-transitory computer readable medium of claim 7, wherein the grading attribute is of a date data type.

12. The non-transitory computer readable medium of claim 7, wherein the mapping of the data record is done by a mapping table stored in the database.

13. A system directed to for segregating at least one data record from a database table into at least two data layers, the system comprising:

a database;

a processor, wherein the processor is configured to perform operations comprising:

retrieving the database table from a database in response to a user-inputted data aging object;

determining, for each of the data records in the database table, the corresponding grading attribute; and mapping each of the data records and at least one other data record to one of the at least two data layers based on the corresponding grading attribute of each of the data records, wherein the at least one other data record corresponds to an at least one other database table, wherein the database table and the at least one other database table correspond to the data aging object;

wherein the data aging object is a data object representing a logical grouping of the database table and the at least one other database table such that the logically grouped database tables are similarly layered and stored in a storage device;

wherein the database is an in-memory database in which frequently accessed data is stored in random-access memory and less frequently accessed data is stored on a hard disk drive.

14. The system of claim 13, wherein the data aging object includes (1) the database table, (2) a grading attribute name and (3) a view.

15. The system of claim 14, wherein the corresponding grading attribute of the data record is determined through the view of a primary key of the database table and a grading attributes field of a table containing the grading attributes.

16. The system of claim 15, wherein the database table and the table containing the grading attributes are joined according to a first date field of the database table and a second date field of the table containing the grading attributes.

17. The system of claim 13, wherein the grading attribute is of a date data type.

18. The system of claim 13, wherein the mapping of the data record is done by a mapping table stored in the database.

* * * * *